(12) United States Patent
Ben-Kiki et al.

(10) Patent No.: US 10,346,195 B2
(45) Date of Patent: Jul. 9, 2019

(54) APPARATUS AND METHOD FOR INVOCATION OF A MULTI THREADED ACCELERATOR

(71) Applicant: Intel Corporation, Santa Clara, CA (US)

(72) Inventors: Oren Ben-Kiki, Tel-Aviv (IL); Ilan Pardo, Ramat-Hasharon (IL); Eliezer Weissmann, Haifa (IL); Robert Valentine, Kiryat Tivon (IL); Yuval Yosef, Hadera (IL)

(73) Assignee: Intel Corporation, Santa Clara, CA (US)

( * ) Notice: Subject to any disclaimer, the term of this patent is extended or adjusted under 35 U.S.C. 154(b) by 350 days.

(21) Appl. No.: 13/730,971

(22) Filed: Dec. 29, 2012

(65) Prior Publication Data

US 2014/0189713 A1 Jul. 3, 2014

(51) Int. Cl.
*G06F 9/46* (2006.01)
*G06F 9/38* (2018.01)
*G06F 9/48* (2006.01)

(52) U.S. Cl.
CPC .......... *G06F 9/462* (2013.01); *G06F 9/3877* (2013.01); *G06F 9/4806* (2013.01)

(58) Field of Classification Search
USPC ................................................ 712/3, 4, 228
See application file for complete search history.

(56) References Cited

U.S. PATENT DOCUMENTS

| | | |
|---|---|---|
| 4,943,915 A | 7/1990 | Wilhelm et al. |
| 4,982,402 A | 1/1991 | Beaven et al. |
| 5,276,798 A | 1/1994 | Peaslee et al. |
| 5,329,615 A | 7/1994 | Peaslee et al. |
| 5,371,849 A | 12/1994 | Peaslee et al. |
| 5,423,025 A | 6/1995 | Goldman et al. |
| 5,430,841 A | 7/1995 | Tannenbaum et al. |
| 5,550,988 A | 8/1996 | Sarangdhar et al. |
| 5,649,230 A | 7/1997 | Lentz |
| 5,890,010 A | 3/1999 | Nishigami |
| 6,061,711 A | 5/2000 | Song et al. |
| 6,081,849 A | 6/2000 | Born et al. |

(Continued)

FOREIGN PATENT DOCUMENTS

| | | |
|---|---|---|
| CN | 1164704 A | 11/1997 |
| CN | 1608246 A | 4/2005 |

(Continued)

OTHER PUBLICATIONS

Microthreading as a Novel Method for Close Coupling of Custom Hardware Accelerators to SVP Processors Jaroslav Sykora, Leos Kafka, Martin Danek, and Lukas Kohout Published: 2011.*

(Continued)

*Primary Examiner* — Emerson C Puente
*Assistant Examiner* — Paul Mills
(74) *Attorney, Agent, or Firm* — Nicholson De Vos Webster & Elliott LLP

(57) ABSTRACT

A processor is described having logic circuitry of a general purpose CPU core to save multiple copies of context of a thread of the general purpose CPU core to prepare multiple micro-threads of a multi-threaded accelerator for execution to accelerate operations for the thread through parallel execution of the micro-threads.

25 Claims, 4 Drawing Sheets

(56) References Cited

U.S. PATENT DOCUMENTS

| | | |
|---|---|---|
| 6,105,127 A | 8/2000 | Kimura et al. |
| 6,148,326 A | 11/2000 | Born et al. |
| 6,247,040 B1 | 6/2001 | Born et al. |
| 6,275,497 B1 | 8/2001 | Varma et al. |
| 6,331,857 B1 | 12/2001 | Hussain et al. |
| 6,341,324 B1 | 1/2002 | Caulk, Jr. et al. |
| 6,397,240 B1 | 5/2002 | Fernando et al. |
| 6,725,416 B2 | 4/2004 | Dadurian |
| 6,742,104 B2 | 5/2004 | Chauvel et al. |
| 6,779,085 B2 | 8/2004 | Chauvel |
| 6,944,746 B2 | 9/2005 | So |
| 6,952,214 B2 | 10/2005 | Naegle et al. |
| 6,957,315 B2 | 10/2005 | Chauvel |
| 7,065,625 B2 | 6/2006 | Alderson |
| 7,079,147 B2 | 7/2006 | Wichman et al. |
| 7,082,508 B2 | 7/2006 | Khan et al. |
| 7,200,741 B1 | 4/2007 | Mine |
| 7,209,996 B2 | 4/2007 | Kohn et al. |
| 7,234,042 B1 | 6/2007 | Wilson |
| 7,302,627 B1 | 11/2007 | Mimar |
| 7,370,243 B1 | 5/2008 | Grohoski et al. |
| 7,480,838 B1 | 1/2009 | Wilkerson et al. |
| 7,545,381 B2 | 6/2009 | Huang et al. |
| 7,583,268 B2 | 9/2009 | Huang et al. |
| 7,598,958 B1 | 10/2009 | Kelleher |
| 7,676,649 B2 | 3/2010 | Rapp et al. |
| 7,746,350 B1 | 6/2010 | Danilak |
| 7,765,388 B2 | 7/2010 | Barrett et al. |
| 7,793,080 B2 | 9/2010 | Shen et al. |
| 7,865,675 B2 | 1/2011 | Paver et al. |
| 7,930,519 B2 | 4/2011 | Frank |
| 8,020,039 B2 | 9/2011 | Reid et al. |
| 8,055,872 B2 | 11/2011 | Biles et al. |
| 8,063,907 B2 | 11/2011 | Lippincott et al. |
| 8,082,426 B2 | 12/2011 | Paltashev et al. |
| 8,140,823 B2 | 3/2012 | Codrescu et al. |
| 8,141,102 B2 | 3/2012 | Aho et al. |
| 8,190,863 B2 | 5/2012 | Fossum et al. |
| 8,212,824 B1 | 7/2012 | Allen et al. |
| 8,230,442 B2 | 7/2012 | Aho et al. |
| 8,281,185 B2 | 10/2012 | Nussbaum et al. |
| 8,345,052 B1 | 1/2013 | Diard |
| 8,424,018 B2 | 4/2013 | Aho et al. |
| 8,683,175 B2 | 3/2014 | Ekanadham et al. |
| 8,776,084 B2 | 7/2014 | Aho et al. |
| 8,780,123 B2 | 7/2014 | Crow et al. |
| 8,959,311 B2 | 2/2015 | Akkar et al. |
| 9,003,102 B2 | 4/2015 | Lassa |
| 9,003,166 B2 | 4/2015 | Sinha et al. |
| 9,015,443 B2 | 4/2015 | Aho et al. |
| 9,053,025 B2 | 6/2015 | Ben-Kiki et al. |
| 9,086,813 B2 | 7/2015 | Zeng et al. |
| 9,189,261 B2 | 11/2015 | Masood |
| 9,275,491 B2 | 3/2016 | Bolz et al. |
| 9,361,116 B2 | 6/2016 | Ben-Kiki et al. |
| 9,396,020 B2 | 7/2016 | Ginzburg et al. |
| 9,417,873 B2 | 8/2016 | Ben-Kiki et al. |
| 9,703,603 B1 | 7/2017 | Roy et al. |
| 2001/0042210 A1 | 11/2001 | Blaker et al. |
| 2002/0004904 A1 | 1/2002 | Blaker et al. |
| 2002/0069327 A1 | 6/2002 | Chauvel |
| 2002/0178349 A1 | 11/2002 | Shibayama et al. |
| 2003/0028751 A1 | 2/2003 | McDonald et al. |
| 2003/0093648 A1* | 5/2003 | Moyer ............... G06F 9/3877 712/34 |
| 2003/0126416 A1 | 7/2003 | Marr et al. |
| 2003/0135718 A1 | 7/2003 | Dewitt et al. |
| 2003/0135719 A1 | 7/2003 | Dewitt et al. |
| 2003/0135789 A1 | 7/2003 | Dewitt et al. |
| 2003/0212874 A1 | 11/2003 | Alderson |
| 2004/0055003 A1 | 3/2004 | Sundaram et al. |
| 2004/0073836 A1 | 4/2004 | Shimada |
| 2004/0111594 A1 | 6/2004 | Feiste et al. |
| 2004/0160446 A1 | 8/2004 | Gosalia et al. |
| 2004/0215444 A1 | 10/2004 | Patel et al. |
| 2004/0227763 A1 | 11/2004 | Wichman et al. |
| 2004/0268071 A1 | 12/2004 | Khan et al. |
| 2005/0149937 A1 | 7/2005 | Pilkington |
| 2005/0166038 A1 | 7/2005 | Wang et al. |
| 2005/0257186 A1 | 11/2005 | Zilbershlag |
| 2006/0050077 A1 | 3/2006 | D'Amora et al. |
| 2006/0095721 A1* | 5/2006 | Biles et al. ............... 712/34 |
| 2006/0095807 A1 | 5/2006 | Grochowski et al. |
| 2006/0200802 A1 | 9/2006 | Mott et al. |
| 2006/0288193 A1 | 12/2006 | Hsu |
| 2007/0050594 A1 | 3/2007 | Augsburg et al. |
| 2007/0103476 A1 | 5/2007 | Huang et al. |
| 2007/0226464 A1 | 9/2007 | Chaudhry et al. |
| 2008/0005546 A1* | 1/2008 | Wang et al. ............. 712/244 |
| 2008/0052532 A1 | 2/2008 | Akkar et al. |
| 2008/0104425 A1 | 5/2008 | Gunther et al. |
| 2008/0222383 A1 | 9/2008 | Spracklen et al. |
| 2009/0019264 A1 | 1/2009 | Correale et al. |
| 2009/0024836 A1 | 1/2009 | Shen et al. |
| 2009/0141034 A1 | 6/2009 | Pryor et al. |
| 2009/0144519 A1 | 6/2009 | Codrescu et al. |
| 2009/0150620 A1 | 6/2009 | Paver et al. |
| 2009/0150722 A1 | 6/2009 | Reid et al. |
| 2009/0198966 A1* | 8/2009 | Gschwind ........... G06F 9/30036 712/208 |
| 2009/0216958 A1* | 8/2009 | Biles et al. ............... 711/148 |
| 2009/0254907 A1 | 10/2009 | Neary |
| 2009/0259996 A1 | 10/2009 | Grover et al. |
| 2009/0309884 A1 | 12/2009 | Lippincott et al. |
| 2010/0058356 A1 | 3/2010 | Aho et al. |
| 2010/0153686 A1 | 6/2010 | Frank |
| 2010/0274972 A1 | 10/2010 | Babayan et al. |
| 2010/0332901 A1 | 12/2010 | Nussbaum et al. |
| 2011/0040924 A1 | 2/2011 | Selinger |
| 2011/0047533 A1* | 2/2011 | Gschwind ............... G06F 8/447 717/140 |
| 2011/0072234 A1 | 3/2011 | Chinya et al. |
| 2011/0093637 A1 | 4/2011 | Gupta et al. |
| 2011/0145778 A1 | 6/2011 | Chen |
| 2011/0271059 A1 | 11/2011 | Aho et al. |
| 2012/0023314 A1 | 1/2012 | Crum et al. |
| 2012/0036339 A1* | 2/2012 | Frazier ............... G06F 9/30101 712/220 |
| 2012/0124588 A1 | 5/2012 | Sinha et al. |
| 2012/0131309 A1 | 5/2012 | Johnson et al. |
| 2012/0139926 A1 | 6/2012 | Clohset et al. |
| 2012/0155777 A1 | 6/2012 | Schweiger et al. |
| 2012/0159090 A1 | 6/2012 | Andrews et al. |
| 2012/0166777 A1 | 6/2012 | McLellan et al. |
| 2012/0239904 A1* | 9/2012 | Ekanadham et al. ......... 711/207 |
| 2012/0311360 A1 | 12/2012 | Balasubramanian, et al. |
| 2012/0331310 A1 | 12/2012 | Burns et al. |
| 2013/0054871 A1 | 2/2013 | Lassa |
| 2013/0159630 A1 | 6/2013 | Lichmanov |
| 2013/0167154 A1 | 6/2013 | Peng et al. |
| 2013/0179884 A1 | 7/2013 | Masood |
| 2013/0205119 A1 | 8/2013 | Rajwar et al. |
| 2013/0332937 A1 | 12/2013 | Gaster et al. |
| 2014/0025822 A1 | 1/2014 | Guha et al. |
| 2014/0176569 A1 | 6/2014 | Meixner |
| 2014/0189317 A1 | 7/2014 | Ben-Kiki et al. |
| 2014/0189333 A1 | 7/2014 | Ben-Kiki et al. |
| 2014/0282580 A1 | 9/2014 | Zeng et al. |
| 2014/0331236 A1 | 11/2014 | Mitra et al. |
| 2014/0344815 A1 | 11/2014 | Ginzburg et al. |
| 2015/0317161 A1 | 11/2015 | Murphy |
| 2016/0246597 A1 | 8/2016 | Ben-Kiki et al. |
| 2016/0335090 A1 | 11/2016 | Weissmann et al. |
| 2016/0342419 A1 | 11/2016 | Oren-Kiki et al. |
| 2017/0017491 A1 | 1/2017 | Ben-Kiki et al. |
| 2017/0017492 A1 | 1/2017 | Ben-Kiki et al. |
| 2017/0109281 A1 | 4/2017 | Weissmann et al. |
| 2017/0109294 A1 | 4/2017 | Weissmann et al. |
| 2017/0153984 A1 | 6/2017 | Weissmann et al. |

FOREIGN PATENT DOCUMENTS

| | | |
|---|---|---|
| CN | 1981280 A | 6/2007 |
| CN | 101083525 A | 12/2007 |

(56) References Cited

FOREIGN PATENT DOCUMENTS

| CN | 101452423 A | 6/2009 |
|---|---|---|
| CN | 101667138 A | 3/2010 |
| CN | 101855614 A | 10/2010 |
| CN | 102270166 A | 12/2011 |
| CN | 102314671 A | 1/2012 |
| CN | 102567556 A | 7/2012 |
| CN | 102741806 A | 10/2012 |
| CN | 102741826 A | 10/2012 |
| NO | 2013147887 A1 | 10/2013 |
| WO | 2014/105128 A1 | 7/2014 |
| WO | 2014/105152 A1 | 7/2014 |

OTHER PUBLICATIONS

Operating System Support for Overlapping-ISA Heterogeneous Multi-core Architectures Tong Li, Paul Brett, Rob Knauerhase, David Koufaty, Dheeraj Reddy, and Scott Hahn Published: 2010.*
Unifying Software and Hardware of Multithreaded Reconfigurable Applications Within Operating System Processes by Miljan Vuletic pp. i, iii, vii-ix, 1-44, 61-99, and 125-136 Published: 2006.*
Developing a reference implementation for a microgrid of microthreaded microprocessors Mike Lankamp pp. 3, 5, 7, 9-10, 15-41, and 55 Published: 2007.*
Making multi-cores mainstream—from security to scalability Chris Jesshope, Michael Hicks, Mike Lankamp, Raphael Poss and Li Zhang Published: 2010.*
A Unified View of Core Selection and Application Steering in Heterogeneous Chip Multiprocessors Sandeep Suresh Navada Abstract, Chapters 1, 3, and 6 Jun. 15, 2012.*
Accelerating Video-Mining Applications Using Many Small, General-Purpose Cores Li, E.; Xiaofeng Tong; Jianguo Li; Yurong Chen; Tao Wang; Wang, P.P; Wei Hu; Yangzhou Du; Yimin Zhang; Yen-Kuang Chen Publisehd: 2008.*
64-bit PowerPC ELF Application Binary Interface Supplement 1.9 Ian Taylor Chapters 1 and 3-3.2.5 Published: 2004.*
Architectures and ABIs detailed Thiago Macieira Published: Jan. 2012.*
PowerPC storage model and AIX programming Mike Lyons Published: 2005.*
Hardware Support for Irregular Control Flow in Vector Processor Huy Vo Published: May 7, 2012.*
Apple-Core: Microgrids of SVP cores Flexible, general-purpose, fine-grained hardware concurrency management Published: Sep. 5, 2012.*
PCT/US2013/048339 Notification of Transmittal of the International Search Report and the Written Opinion of the International Searching Authority, mailed Nov. 1, 2013, 10 pages.
PCT/US2013/048339 International Preliminary Report on Patentability, mailed Jun. 30, 2015, 6 pages.
Office action from U.S. Appl. No. 13/730,055, mailed Jul. 27, 2015, 11 pages.
PCT/US2013/046166 Notification of Transmittal of the International Search Report and the Written Opinion of the International Searching Authority, mailed Sep. 2, 2013, 9 pages.
PCT/US2013/046166 Notification Concerning Transmittal of International Preliminary Report on Patentability , mailed Jul. 9, 2015, 6 pages.
Office action from U.S. Appl. No. 13/730,143, mailed Aug. 11, 2015, 13 pages.
PCT/US2013/046911 Notification of Transmittal of the International Search Report and the Written Opinion of the International Searching Authority, mailed Sep. 27, 2013, 10 pages.
PCT/US2013/046911 Notification Concerning Transmittal of International Preliminary Report on Patentability, mailed Jul. 9, 2015, 7 pages.
Notice of Allowance from U.S. Appl. No. 13/730,055, mailed Feb. 25, 2016, 5 pages.
Notice of Allowance from U.S. Appl. No. 13/730,055, mailed Apr. 15, 2016, 8 pages.
Final Office action from U.S. Appl. No. 13/730,143, mailed May 4, 2016, 15 pages.
IBM Technical Disclosure Bulletin NN84102905 "Multiprocessor System to Improve Context Switching," Oct. 1984, 4 pages.
Non-Final Office Action from U.S. Appl. No. 15/281,944 dated November 25, 2016, 23 pages.
Non-Final Office Action from U.S. Appl. No. 15/282,082 dated November 28, 2016, 26 pages.
Notice of Allowance for foreign counterpart Korean Application No. 10-2015-7012861, dated Mar. 29, 2016, 3 pages.
Office action for foreign counterpart Korean Application No. 10-2015-7012861, dated Dec. 11, 2015, 5 pages.
Office Action from Foreign Counterpart Chinese Patent Application No. 201380059874.8, dated Sep. 5, 2016, 17 pages.
Notice of Allowance from U.S. Appl. No. 13/730,719, dated Nov. 13, 2017, 11 pages.
Notice of Allowance from U.S. Appl. No. 15/145,748, dated Mar. 12, 2018, 14 pages.
Notice of Allowance from U.S. Appl. No. 15/281,944, dated Dec. 8, 2017, 28 pages.
Notice of Allowance from U.S. Appl. No. 15/282,082, dated Dec. 20, 2017, 14 pages.
Office Action from foreign counterpart China Patent Application No. 201380059874.8, dated May 16, 2017, 3 pages.
Request for Amendment from foreign counterpart Korean Patent Application No. KR1020157012861, dated May 27, 2015, 5 pages.
Second Office Action from foreign counterpart Chinese Patent Application No. 201380059888, dated Oct. 16, 2017, 15 pages.
Choi J., et al., "Impact of Cache Architecture and Interface on Performance and Area of FPGA-Based Processor/Parallel-Accelerator Systems," IEEE 20th International Symposium on Field-Programmable Custom Computing Machines, 2012, pp. 17-24.
Decision to Grant a Patent from foreign counterpart Korean Patent Application No. 10-2016-7029367, dated Apr. 26, 2017, 4 pages.
Final Office Action from U.S. Appl. No. 13/729,915, dated Dec. 2, 2015, 24 pages.
Final Office Action from U.S. Appl. No. 13/730,143, dated Aug. 7, 2017, 16 pages.
Final Office Action from U.S. Appl. No. 13/730,719, dated Dec. 15, 2015, 10 pages.
Final Office Action from U.S. Appl. No. 15/145,748, dated Mar. 29, 2017, 41 pages.
Final Office Action from U.S. Appl. No. 15/226,875, dated May 17, 2017, 36 pages.
Final Office Action from U.S. Appl. No. 15/281,944, dated May 10, 2017, 12 pages.
Final Office Action from U.S. Appl. No. 15/282,082, dated Apr. 24, 2017, 38 pages.
First Office Action and Search Report from foreign counterpart China Patent Application No. 20138005989.8, dated Sep. 1, 2017, 10 pages.
First Office Action and Search Report from foreign counterpart Chinese Patent Application No. 201380059921.9, dated Sep. 20, 2017, 10 pages. (Translation available only for office action).
Grant of Patent from foreign counterpart Korean Patent Application No. 10-2016-7029366, dated Jul. 31, 2017, 4 pages.
Gschwind M., "Optimizing Data Sharing and Address Translation for the Cell BE Heterogeneous Chip Multiprocessor," IEEE, 2008, pp. 478-485.
Intel 915G/915GV/91 OGL Express Chipset Graphics and Memory Controller Hub (GMCH)—White Paper' Sep. 2004 by Intel, 9 pages.
International Preliminary Report on Patentability for Application No. PCT/US2013/047387, dated Jun. 30, 2015, 5 pages.
International Preliminary Report on Patentability for Application No. PCT/US2013/048694, dated Jul. 9, 2015, 6 pages.
International Preliminary Report on Patentability for International Application No. PCT/US2013/046863, dated Jul. 9, 2015, 6 pages.
International Search Report and Written Opinion for Application No. PCT/U52013/046863, dated Aug. 28, 2013, 9 pages.
International Search Report and Written Opinion for Application No. PCT/U52013/047387, dated Sep. 2, 2013, 9 pages.

(56) References Cited

OTHER PUBLICATIONS

International Search Report and Written Opinion for Application No. PCT/US2013/048694, dated Sep. 30, 2013, 9 pages.
Non-Final Office Action from U.S. Appl. No. 13/729,915, dated Jul. 23, 2015, 22 pages.
Non-Final Office Action from U.S. Appl. No. 13/729,931, dated Oct. 3, 2014, 13 pages.
Non-Final Office Action from U.S. Appl. No. 13/730,143, dated Apr. 17, 2017, 36 pages.
Non-Final Office Action from U.S. Appl. No. 13/730,719, dated May 13, 2015, 11 pages.
Non-Final Office Action from U.S. Appl. No. 13/730,719, dated Sep. 23, 2016, 19 pages.
Non-final Office Action from U.S. Appl. No. 15/145,748, dated Oct. 33, 2016, 22 pages.
Non-final Office Action from U.S. Appl. No. 15/145,748, dated Sep. 22, 2017, 30 pages.
Non-Final Office Action from U.S. Appl. No. 15/226,875, dated Oct. 34, 2016, 25 pages.
Non-Final Office Action from U.S. Appl. No. 15/226,875, dated Sep. 12, 2017, 19 pages.
Non-Final Office Action from U.S. Appl. No. 15/282,082 dated Aug. 2, 2017, 32 pages.
Notice of Allowance for foreign counterpart Korea Application No. 10-2015-7012995, dated Jul. 20, 2016, 3 pages.
Aotice of Allowance from U.S. Appl. No. 13/729,915, dated Feb. 17, 2016, 10 pages.
Notice of Allowance from U.S. Appl. No. 13/729,931, dated Feb. 2, 2015, 5 pages.
Notice of Allowance from U.S. Appl. No. 13/730,719, dated May 18, 2017, 19 pages.
Notice of Preliminary Rejection for foreign counterpart Korean Application No. 10-2015-7012995, dated Feb. 22, 2016, 12 pages.
Notice of Preliminary Rejection from foreign counterpart Korean Patent Application No. KR1020167029366, dated Jan. 19, 2017, 13 pages.
Notice on Grant of Patent Right for Invention from foreign counterpart Chinese Patent Application No. 201380059874.8, dated Sep. 12, 2017, 4 pages.
Office Action from foreign counterpart Chinese Patent Application No. 201380059888, dated Feb. 7, 2017, 18 pages.
Office Action from foreign counterpart Korean Patent Application No. 1020167029367, dated Oct. 27, 2016, 6 pages.
Abandonment from U.S. Appl. No. 13/730,143, dated Apr. 24, 2018, 3 pages.
Corrected Notice of Allowability from U.S. Appl. No. 15/145,748, dated Jul. 11, 2018, 9 pages.
Final Office Action from U.S. Appl. No. 15/226,875, dated Jun. 29, 2018, 26 pages.
Notice of Allowance from U.S. Appl. No. 15/281,944, dated Jun. 27, 2018, 9 pages.
Third Office Action from foreign counterpart Chinese Patent Application No. 201380059888.0, dated Jul. 3, 2018, 17 pages.
First Office Action and Search Report from foreign counterpart Chinese Patent Application No. 2016110888386, dated Apr. 28, 2018, 24 pages.
Notice of Allowance from U.S. Appl. No. 15/145,748, dated Jun. 6, 2018, 15 pages.
Notice of Allowance from U.S. Appl. No. 13/730,719, dated Mar. 27, 2018, 19 pages.
Notice of Allowance from U.S. Appl. No. 15/281,944, dated Mar. 26, 2018, 18 pages.
Notice of Allowance from U.S. Appl. No. 15/282,082, dated Mar. 30, 2018, 14 pages.
Notice on Grant of Patent Right for Invention from foreign counterpart Chinese Patent Application No. 201380059899.8, dated May 4, 2018, 4 pages.
Second Office Action from foreign counterpart Chinese Patent Application No. 201380059921.9, dated Mar. 20, 2018, 7 pages.

* cited by examiner

APPARATUS AND METHOD FOR INVOCATION OF A MULTI THREADED ACCELERATOR

FIELD OF INVENTION

The field of invention relates generally to computing system design, and, more specifically, to an apparatus and method for invocation of a multi-threaded accelerator.

BACKGROUND

As semiconductor manufacturing processes are reaching an era that approaches 1 trillion transistors per die, design engineers are presented with the issue of how to most effectively put to use all the available transistors. One design approach is to implement specific computation intensive functions with dedicated hardware "acceleration" on die along with one or more general purpose CPU cores.

Acceleration is achieved with dedicated logic blocks designed to perform specific computation intensive functions. Migrating intensive computations to such dedicated logic blocks frees the CPU core(s) from executing significant numbers of instructions thereby increasing the effectiveness and efficiency of the CPU core(s).

Although "acceleration" in the form of co-processors (such as graphics co-processors)) are known in the art, such traditional co-processors are viewed by the OS as a separate "device" (within a larger computing system) that is external to the CPU core(s) that the OS runs on. These co-processors are therefore accessed through special device driver software and do not operate out of the same memory space as a CPU core. As such, traditional co-processors do not share or contemplate the virtual addressing-to-physical address translation scheme implemented on a CPU core.

Moreover, large latencies are encountered when a task is offloaded by an OS to a traditional co-processor. Specifically, as a CPU core and a traditional co-processor essentially correspond to separate, isolated sub-systems, significant communication resources are expended when tasks defined in the main OS on a GPP core are passed to the "kernel" software of the co-processor. Such large latencies favor system designs that invoke relatively infrequent tasks on the co-processor from the main OS but with large associated blocks of data per task. In effect, traditional co-processors are primarily utilized in a coarse grain fashion rather than a fine grain fashion.

As current system designers are interested in introducing more acceleration into computing systems with finer grained usages, a new paradigm for integrating acceleration in computing systems is warranted.

FIGURES

The present invention is illustrated by way of example and not limitation in the figures of the accompanying drawings, in which like references indicate similar elements and in which.

DETAILED DESCRIPTION

Although "acceleration" in the form of co-processors (such as graphics co-processors)) are known in the art, such traditional co-processors are viewed by the OS as a separate "device" (within a larger computing system) that is external to the CPU core(s) that the OS runs on. These co-processors are therefore accessed through special device driver software and do not operate out of the same memory space as a CPU core. As such, traditional co-processors do not share or contemplate the virtual addressing-to-physical address translation scheme implemented on a CPU core.

Moreover, large latencies are encountered when a task is offloaded by an OS to a traditional co-processor. Specifically, as a CPU core and a traditional co-processor essentially correspond to separate, isolated sub-systems, significant communication resources are expended when tasks defined in the main OS on a GPP core are passed to the "kernel" software of the co-processor. Such large latencies favor system designs that invoke relatively infrequent tasks on the co-processor from the main OS but with large associated blocks of data per task. In effect, traditional co-processors are primarily utilized in a coarse grain fashion rather than a fine grain fashion.

As current system designers are interested in introducing more acceleration into computing systems with finer grained usages, a new paradigm for integrating acceleration in computing systems is warranted.

Figure 1:
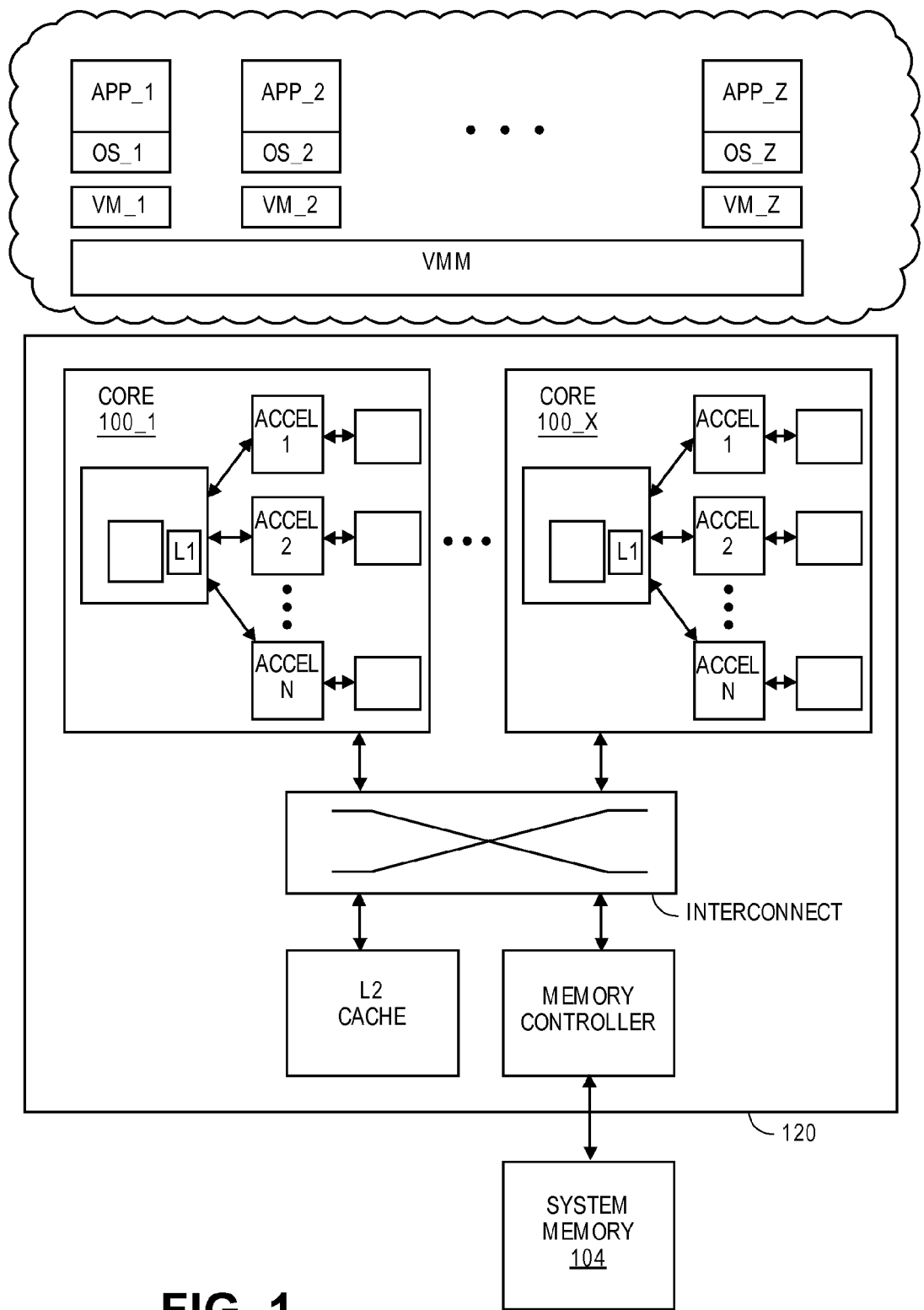
FIG. 1 shows a computing system whose processing cores each include a general purpose processing core and accelerators that are tightly coupled to the general purpose processing core.

FIG. 1 shows new processing core 100_1 architecture in which accelerators ACCEL 1 to ACCEL N are designed akin to large scale functional units coupled to the core's traditional general purpose CPU 102. Multiple such cores 100_1 to 100_Q may be disposed on a single processor 120 disposed on a semiconductor chip as observed in FIG. 1.

Here, standard instructions are read from memory and executed by the core's traditional functional units in the CPU core 102. Other types of instructions that are received by the processing core 100_1, however, will trigger an accelerator into action. In a particular implementation, the underlying hardware supports the software's ability to call out a specific accelerator in code. That is, a specific command can be embodied into the code by the software programmer (or by a compiler), where, the specific command calls out and defines the input operand(s) for a specific accelerator unit.

The command is ultimately represented in some form of object code. During runtime, the underlying hardware "executes" the object code and, in so-doing, invokes the specific accelerator with the associated input data.

Upon being invoked, the accelerator operates out of the same memory space as the CPU core 102. As such, data operands may be identified to the accelerator with virtual addresses whose corresponding translation into physical address space is the same as those used by the CPU core 102. Moreover, generally, the execution time of an accelerator unit's execution of a command is longer than that of a traditional/standard instruction (owing to the complex nature of the tasks being performed). The input operand(s) and/or resultant may also be larger than the standard register sizes of the instruction execution pipeline(s) within the CPU 102.

An accelerator can therefore be generally viewed as being coarser grained (having larger execution times and/or operating on larger data chunks) than the traditional functional units and instructions of the CPU 102. At the same time, an accelerator can also generally be viewed as being finer grained, or at least more tightly coupled to the CPU core 102 than a traditional co-processor.

Specifically, the avoidance of a time expensive "driver call" in order to invoke the accelerator and/or the sharing of same memory space by the accelerator and general purpose CPU 102 corresponds to tighter coupling to the between the general purpose CPU 102 and accelerator as compared to that of a traditional co-processor. Moreover, the specific individual tasks that the accelerators are called on to perform may also be more fine grained than the larger, wholesale tasks traditionally performed by a co-processor. Specific individual tasks that are suitable for implementation with an accelerator as a single "invokable" operation include texture sampling, motion search or motion compensation, security related computations (e.g., cryptography, encryption, etc.), specific financial computations, and/or specific scientific computations.

The general purpose CPU core 102 may have one or more instruction execution pipelines. Modern day CPU cores are typically capable of concurrently executing multiple threads. Concurrent execution of multiple threads with multiple pipelines is a straightforward concept. However, a single pipeline can also be designed to support concurrent execution of multiple threads as well.

Figure 2:
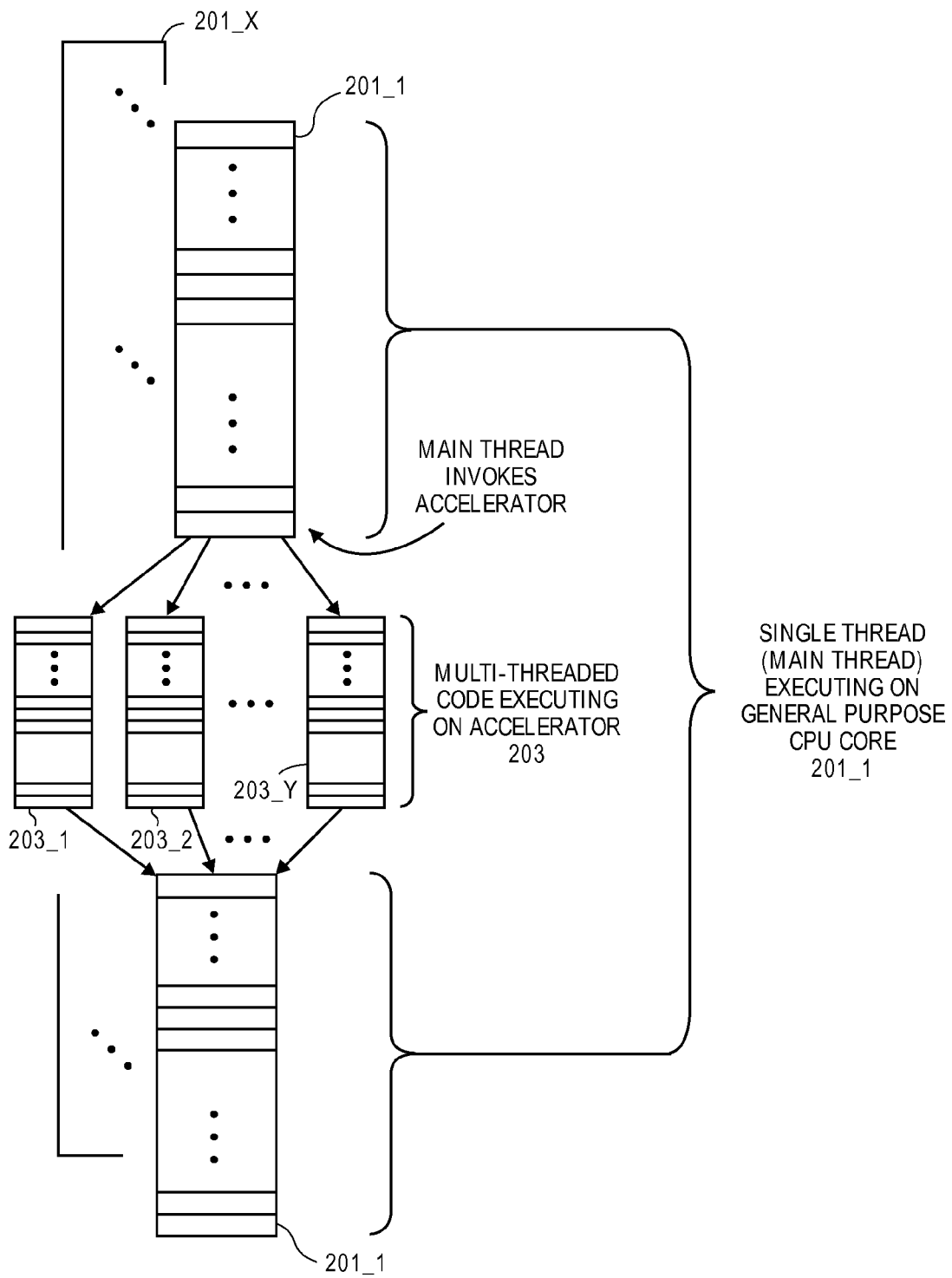
FIG. 2 shows a process for invoking a multi-threaded accelerator core from a main general purpose CPU core.

As the purpose of an accelerator is to provide higher performance for specific computations than what the general purpose CPU core is capable of providing, some discussion of how "higher performance" might be obtained is worthwhile. FIG. 2 shows an exemplary thread 201_1 that is executing on the general purpose CPU core. Note that the general purpose CPU core is a multi-threaded core that is concurrently supporting the execution of at least one other thread 201_X. Consistent with the common understanding of a thread, as observed in FIG. 2, each of threads 201_1 to 201_X is a single stream of instructions.

At point 202, thread 201_1 invokes an accelerator. In a typical implementation, the accelerator includes one or more special purpose execution units that are specially designed to perform complex tasks. The invocation of these special purpose execution units provides some of the acceleration provided by the accelerator. As observed in FIG. 2, however, the invocation of the accelerator also spawns multiple "micro-threads" 203_1 to 203_Y.

Micro-threads 203_1 to 203_Y are to be distinguished from micro-code. Micro-code is atomic program code internal to an execution unit that the execution unit utilizes to perform the instructions it is designed to perform. The execution units of the accelerator may be micro-coded but need not be. Micro-threads 203_1 to 203_Y, by contrast, are instruction streams like threads 201_1 to 201_X. That is, micro-threads 203_1 to 203_Y specify the instructions to be performed by the execution units of the accelerator, rather than correspond to internal program code within the execution units.

Referring to FIG. 2, then, the acceleration that is provided by the accelerator stems at least in part from parallel execution of multiple threads 203_1 to 203_Y as opposed to execution of single thread 201_1. Said another way, in an embodiment, the acceleration provided by the accelerator is realized not only through the invocation of specialized execution units, but also, the parallel execution of multiple threads through them. In an embodiment, for example, acceleration is provided by a multiple instruction multiple data (MIMD) accelerator with specialized execution units whereas the CPU core that the main thread 201_1 is executed upon corresponds to a single instruction machine such as single instruction single data (SISD) and/or single instruction multiple data (SIMD) with general purpose execution units.

Spawning multiple micro-threads 203_1 to 203_Y into an instruction set architecture (ISA) that is different than the ISA of the main thread 201_1 is more common than spawning multiple micro-threads into an ISA that is the same as the main thread. In a typical case where the accelerator ISA is different than the main thread ISA (e.g., a GPU), the accelerator and main thread execute out of different and isolated program memory regions and data memory regions. In a phrase, the general purpose CPU core and accelerator are different isolated machines each having their own respective program code and data domains.

Figure 3:
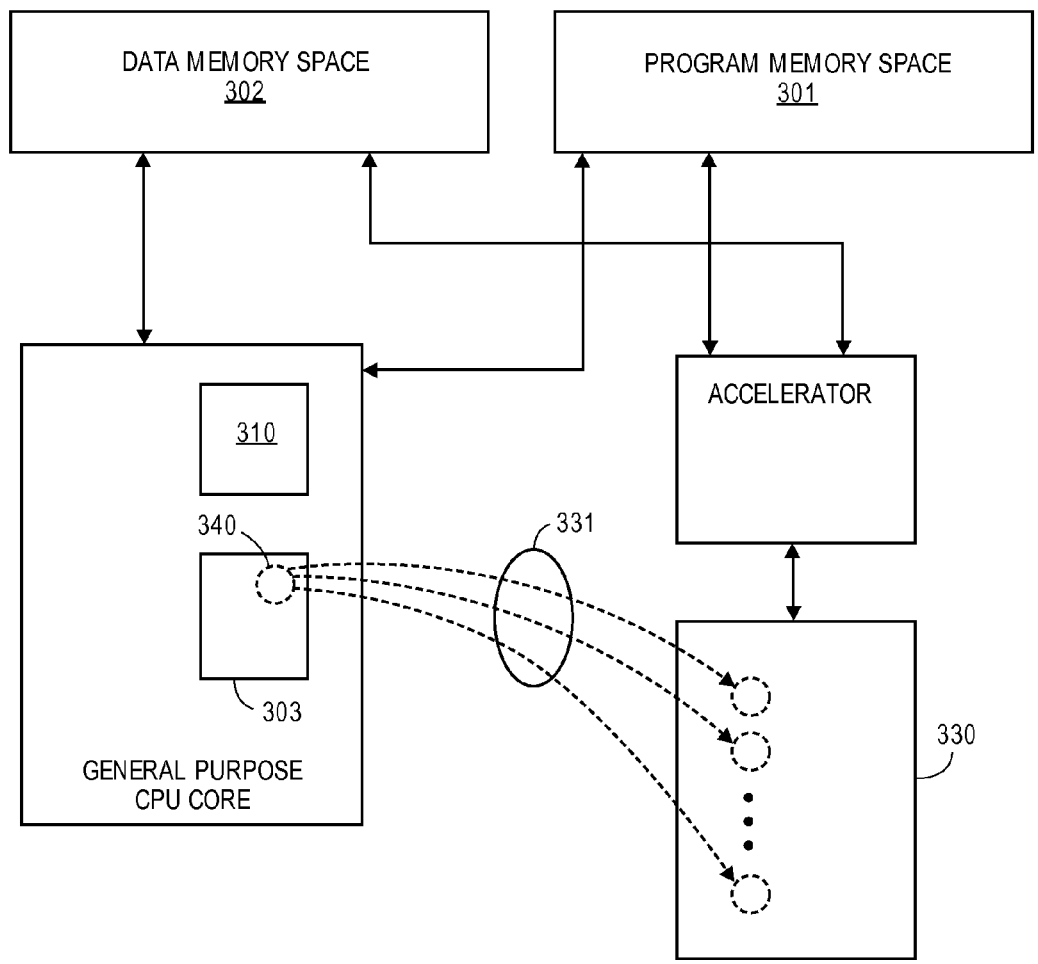
FIG. 3 shows an embodiment of a processor having a general purpose CPU core and an accelerator where the general purpose CPU core includes logic circuitry to create multiple copies of the main thread's context for the multiple micro-threads of the accelerator.

By contrast, in the case where the mirco-threads 203_1 to 203_Y are executed on the same ISA as the main thread 201_1, significantly closer linkage between the accelerator and the main thread/general purpose CPU core is possible. For example, referring to FIGS. 2 and 3, the accelerator's micro threads 203_1 to 203_Y may operate out of the same program memory space 301 as the main thread 201_1. Another possibility is that the micro-threads 203_1 to 203_Y can use data not only from the same data memory space 302 as the main thread 201_1, but also, potentially, the same register space 303. That is, the accelerator could conceivably utilize at least the data registers 303 of the general purpose CPU instruction execution pipeline that is processing the main thread 201_1.

In order to support invocation of a multi-threaded accelerator where the ISA does not change as compared to the general purpose CPU certain semantic definitions should be established. These include definitions for: i) initial micro-thread architectural state; ii) maintenance of micro-architectural state; iii) thread scheduling; and, iv) final micro-thread architectural state. Other semantic definitions should be defined for exceptions, interrupts and violations. Each of these are discussed in succession below.

Micro-Thread Initialization, Maintenance, Scheduling and Conclusion

Initialization of micro-thread architectural state corresponds to the environment in which each of the micro-threads are started. In an embodiment where the accelerator and general purpose CPU core are closely linked, the micro-threads may be started in a fashion that is the same or similar to the manner in which subroutines are called by a main program executing as a typical/standard thread on the general purpose CPU core. As such, some if not all aspects of an Application Binary Interface (ABI) or embedded ABI (EABI) that is supported by the general purpose CPU core ISA are used to start the micro-threads. As such, there is similarity between the manner in which the main thread invokes the accelerator and the manner in which the main thread calls upon a typical subroutine that is executed on the general purpose CPU core.

An ABI or EABI essentially defines how a function call is made from a first routine to a second, subroutine. Part of an ABI or EABI (hereinafter, simply "ABI") specifies standard conventions for file formats, data types, register usage, stack frame organization, and function parameter passing of an embedded software program. Another factor for consideration is that a thread, by definition, has its own "context", where, context corresponds to the specific values within instruction, data and control register and/or memory space.

Two different threads, unless they correspond to identical programs operating on identical data are expected to have different contexts over the course of their execution. In this sense, the multiple micro-threads of the accelerator can be viewed as independent threads having their own respective contexts.

As such, in an embodiment, the invocation of a multi-threaded accelerator by a general purpose CPU core thread includes passing multiple instances of the main thread's context to each of the multiple accelerator threads, where, each passing of the main thread's context is performed consistently with the ABI of the main core's ISA. At one extreme, the accelerator has its own associated registers 330 including dedicated register space for each individual micro-thread, and, copies of the main thread's context is copied over multiple times 331 into each micro-thread's dedicated accelerator register space 330. In this case, the general purpose CPU core includes first logic circuitry 310 to copy 331 the different copies of the main thread's context into the dedicated register space 330 of the accelerator.

According to this same approach, the main thread's context can subsequently be "switched out" of the general purpose CPU core while the accelerator is performing its task. As such, another thread, e.g., of another program can have its context switched into the general purpose CPU core and execute in its place during accelerator execution.

In another extreme, each of the accelerator's multiple micro-threads is simply given access to the main thread's context as it is sitting in the register space 340 of the main CPU core. In this case, the main thread's context may or may not be switched out of the main CPU core depending on designer preference as to whether or not the main thread's context is to be made permanently available or only initially available to the accelerator micro-threads. The main thread's context can be switched out as described above in the later case.

In another approach where the micro-threads operate out of the general CPU core's register space 303, just prior to the actual invocation of the accelerator code, the main thread executes one or more allocation instructions to allocate the stack region and a copy of the main thread's context, for each micro-thread, within the main CPU core register space 303. The allocated stack reserves space for each micro thread to make its own function call.

With respect to the allocation of the main thread's context, each micro-thread of the accelerator has its own copy of the main thread's context in register (for ease of drawing neither these copies nor the coupling between the accelerator and register space 303 is shown). Therefore, again, the general purpose CPU core includes logic circuitry 310 to store multiple copies of the main thread's context (although in this case the different copies are stored in the register space 303 of the general purpose CPU core). Technically speaking, register space 303 corresponds to the operand and control register space used by the instruction execution pipeline that is executing the main thread. Here, logic circuitry 310 may be the logic circuitry used to execute an allocation instruction (aloc).

In another intermediate approach, the main thread's context is copied over to an intermediate buffer or storage area (e.g., spare register and/or memory space (not shown in FIG. 3) that the accelerator micro-threads refer to. In this case, the main thread's context can be switched out of the general purpose CPU core after its context has been written to the intermediate buffer.

In a further embodiment, as matter of efficiency, less than all of the context of the main thread is made available to the micro-threads by logic circuitry 310. For example, according to one approach, if the accelerator does not make use of content with a particular type of register space (such as SIMD register space), the context of that register type is not made available to the micro-threads (e.g., the micro-threads are not provided with SIMD context).

In another or related embodiment, the micro-threads are only provided from logic circuitry 310 with context that can be identified and/or used by the ABI. Here it is pertinent to understand the dynamic of a function call made through an ABI. Typically, a function call only passes a few "input" parameters to the sub-routine it is calling. The sub routine then performs its operations without any further reference to the calling thread's data. As such, only a limited set of register space that is used to pass just the input parameters to the called routine, are actually utilized by the ABI. Thus an ABI may set a limit or otherwise identify a smaller subset of registers than the entire context of the calling thread.

Along a similar train of thought, when a main thread invokes an accelerator and its multiple micro-threads, the context information of the main thread that is passed to the micro-threads only corresponds to the limited subset of context information permitted by the ABI. In the case of an ISA that supports multiple, different ABIs, the subset of registers may correspond to one, more than one or all of the ABIs can be chosen as the permissible set of context that can be passed to the micro-threads. As such, the general purpose CPU core either re-uses the logic circuitry used to effect a typical sub-routine function call amongst threads processed by the general purpose CPU core for the purpose of invoking the accelerator, or, has added logic circuitry used to effect an invocation of the accelerator consistent with the ABI.

In various embodiments, regardless of how the accelerator is provided with context of the main thread, the context of the main thread (e.g., the architectural state of the machine for the main thread when (e.g., immediately after) the accelerator is invoked) is not modified except for the instruction pointer being modified (e.g., incremented) and some registers being adjusted to reflect the execution status (success/failure and related details). Said another way, any changes made to the main threads context/architectural state in micro-thread are hidden from the invoking application of the main thread. This allows the micro-threads to execute at order.

In a further embodiment, since the accelerator can operate out of the same program memory space as the main thread, the instruction pointer is changed as part of the invocation process to point to the start of the accelerator code. As such, the instruction pointer context of the main thread is not copied as part of the accelerator invocation that the micro-threads operate out of (it can be copied to return program flow to the main thread after the accelerator has completed its operations). Here, it is worthwhile to point out that a programmed, multi-threaded accelerator is expected to have its own instruction fetch unit(s) for fetching the micro-thread instructions from program memory.

Depending on approach, one of the accelerator's micro-threads can be deemed the master micro-thread that starts operation before the other micro-threads, and, controls the start of one or more of the other micro-threads. In this case, micro-thread scheduling is essentially performed by the compiler that creates the micro-threads (through its crafting of the master micro thread code). In an embodiment, the instruction pointer is changed to point to the start of the master micro-thread. This approach may be suitable where there is some relatedness amongst the threads (i.e., the threads are not operating in total isolation).

In an alternate embodiment, e.g., where the micro-threads have no relation or dependencies on each other, a group of instruction pointers is passed to the accelerator each having a respective starting address for a different one of multiple micro-threads (such as all the micro-threads of the code to be executed by the accelerator). The micro-threads simply start, e.g., in parallel, through immediate reference to their respective instruction pointer. The group of instruction addresses can be passed as input parameters of the invocation made by the main thread of the general purpose CPU core. Here, a separate register permitted for use by the ABI may be used for each different starting address. In another approach, if the accelerator code is able to refer to SIMD register space, the starting addresses may be kept within a single vector within the SIMD register space.

If the micro-threads have some relatedness, in an embodiment, micro-thread scheduling hints are provided to the accelerator by the main thread as an input parameter of the accelerator invocation. For example, specific input parameters describing some aspect of the start sequence order of the different micro-threads may be passed from the main thread to the accelerator hardware. The accelerator hardware instruction fetch logic refers to this information to understand or determine which micro-threads should be started at which cycle time. The instruction address pointers for the individual micro-threads may be passed to the accelerator by any of the techniques discussed just above. In an embodiment, the compiler adds the hints to the main thread code.

The specific results returned by the accelerator to the main thread are, in an embodiment, also presented in a manner consistent with the ABI. In an embodiment, a master microthread of the accelerator combines and/or oversees the results of the multiple micro-threads into a single result. In an embodiment, just before the accelerator resultant is returned to the main thread, any micro-thread context within the general purpose CPU core's register space is switched out of the general purpose CPU core's register space, and, if the main thread's context was switched out of the main CPU core's register space during accelerator operation, it is switched back into the general purpose CPU core's register space. As such, the main thread returns to the state that it invoked the accelerator from and reawakes to find the result returned from the accelerator. The result can be a scalar provided in scalar register space, or, a vector provided in vector (e.g., SIMD register space).

Here, for any of the context switching activities described above, where main thread or micro-thread context is switched in/out of the general purpose CPU core's register space, the general purpose CPU core has respective logic circuitry designed to effect the respective context switching activity.

Exceptions, Interrupts and Violations

An exception is a problem detected within one of the accelerator's micro-threads, typically by the micro-thread itself. An interrupt is an event that is external to the accelerator (e.g., a new user command is entered).

Figure 4:
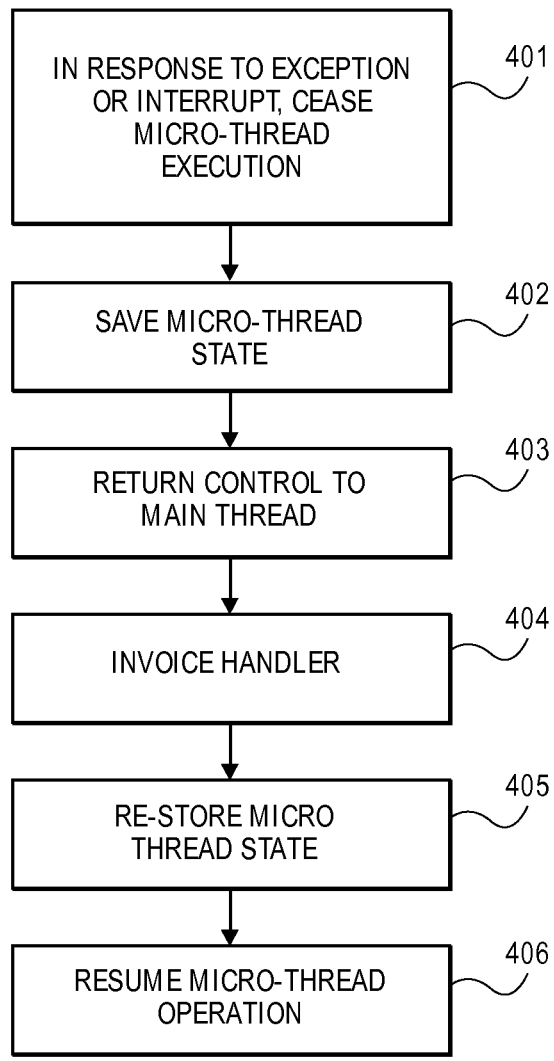
FIG. 4 shows a method for exception and/or interrupt handling.

In an embodiment, referring to FIG. 4, in the case of either an exception or interrupt, the accelerator micro-threads cease execution 401. Any state information internal to the accelerator is, for each of the micro-threads, saved externally such as to memory (e.g., memory space (e.g, the user stack) of the application that invoked the accelerator), register space private to the accelerator, or, register space of the main CPU core 402. Essentially, the state of the micro-threads is frozen and externally saved. Control is returned to the main thread which awakes in its state as of the moment of its invocation of the accelerator (the stack pointer may be modified to reflect additional stack usage) 403. Here, in the case of an exception, the accelerator may return a result of "exception" to inform the main thread that the exception handler is needed. In the case of an interrupt, another active thread on the general purpose CPU core may trigger the accelerator to dump its state and wake the main thread.

The main thread then invokes an exception and/or interrupt handler which handles the problem (e.g., by referring to the externally saved micro-thread state information in the case of an exception) 404. After the problem is handled, the interrupt/exception handler restores the externally saved state of the micro-threads back into the accelerator 405. The accelerator's micro-threads then resume operation from the point of the original interrupt/exception 406.

In an alternate approach, in the case of an exception, rather than return to the main thread to have it call the exception handler, instead, the accelerator hardware calls the exception handler directly without waking the main thread and passes a pointer to the location of the saved state information of the excepting thread (here, the internal state information of the micro-threads within the accelerator are again externally saved in response to the exception). According to this approach, the exception handler refers directly to the excepting code and fixes the problem. Execution is subsequently returned to the accelerator, e.g., without involvement of the main CPU thread. The accelerator recalls the externally saved micro-thread state information and resumes operation.

In an embodiment, state information associated with the original invocation of the accelerator by the main thread is saved in register or memory space so that program control can pass from the exception handler to the accelerator directly without involvement of the main thread. According to one approach, the logic circuitry that implements an IRET instruction (or similar instruction used to determine where program flow is directed upon return from the interrupt handler) include micro-code or other circuitry that uses the saved invocation state information to return flow to the accelerator. As such, the IRET instruction has an input parameter of some kind that indicates the interrupt is from the accelerator, and, in response, returns program flow to the accelerator. Without the input parameter indicating the exception is from the accelerator, the IRET instruction logic/micro-code returns program flow to a main CPU thread.

In other embodiments, the exception handler may be redesigned to use the saved invocation state information to return flow to the accelerator, or, the excepting micro-thread is allowed to complete, in effect, continuing operation to the extent possible as if no exception was thrown. In the later approach, accelerator micro-thread state need not be externally saved. When the accelerator finally returns its result to the main thread, the earlier exception causes the main thread to invoke the exception handler. When the exception handler fixes the problem, the accelerator is re-invoked from scratch as if the accelerator had not been invoked earlier. Here, the saved state information of the saved invocation can be used to re-invoke the accelerator.

A violation is trigged from code that does not comply with a requirement established by the underlying machine. According to one possibility, the accelerator itself may impose restrictions, such as restrictions on the accelerated application callback code (e.g., 64 bit mode only, etc.). In the case that micro-thread code does not comply with a requirement established for the accelerator, the violation can be labeled as such but treated the same or similarly to that as an exception.

In one embodiment, the exception handler can use the storage area where micro-thread state is saved to complete the originally accelerated operation in a non-accelerated mode (e.g., with the general purpose CPU core). At completion of the operation, the exception handler returns execution to the instruction following the accelerator invocation. Alternatively or in combination, the instruction that triggered the violation is executed in software (e.g., with instructions executed by the general purpose CPU core) in order to effect its operation. The micro-thread that raised the violation has its state saved as described above by the handler with a marker to return operation to the next instruction following the violating instruction when its operation is resumed.

In another approach, the violation is hidden from the software (e.g., the main application software program that invoked the accelerator) altogether. That is, there is no exception handler. Instead, the processor uses micro-code to perform the following in a manner that is hidden from the software: 1) freeze the state of the threads 'as if' an exception handler were being called (e.g., externally save micro-thread state); and; 2) not invoke an exception handler and instead, continue execution (e.g., with micro-code) from the freeze point on the general purpose CPU (e.g., which supports all the instructions so there's no problem). At that point the recovery can either switch execution back to the accelerator ("unfreezing") from the "updated" point (since we executed at least one instruction in the general purpose CPU), or, just finish the execution of all the micro-threads on the general purpose CPU, without switching back to the accelerator at all. This is very different from allowing a software exception handler to use the general purpose CPU, because a software handler isn't invoked at all. As far as the software is concerned, the system "just works" without any exceptions.

Here, the general purpose CPU and/or accelerator may have respective one or more logic circuits to effect any of the processes discussed above.

Any of the processes taught by the discussion above may be performed with software, hardware logic circuitry or some combination thereof. It is believed that processes taught by the discussion above may also be described in source level program code in various object-orientated or non-object-orientated computer programming languages. An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A processor comprising:
a core to execute a thread which invokes an accelerator of the processor, wherein the invocation includes a group of instruction pointers each having a different starting address for a respective micro-thread of multiple micro-threads;
logic circuitry to pass a copy of a context of the thread for each of the multiple micro-threads and the group of instruction pointers to the accelerator upon the invocation of the accelerator by the thread; and
the accelerator to execute the multiple micro-threads in parallel using the copies of the context, wherein the thread and the multiple micro-threads are of a same instruction set architecture.

2. The processor of claim 1 further comprising logic circuitry to invoke said accelerator from said thread with a set of registers identified by an Application Binary Interface (ABI) that specifies semantics of a call made by one routine to another routine.

3. The processor of claim 1 wherein said copy of the context for each of the multiple micro-threads is saved to register space of an instruction execution pipeline of said core.

4. The processor of claim 1 further comprising logic circuitry to switch said thread's context out of a register space of an instruction execution pipeline of said core so that said thread's context is not consuming said register space while said accelerator is to execute the multiple micro-threads.

5. The processor of claim 1 further comprising logic circuitry to determine a start sequence of said multiple micro-threads from a hint provided through said thread's invocation of said accelerator.

6. The processor of claim 1 further comprising logic circuitry to freeze and save state information of said multiple micro-threads during operation of said accelerator responsive to at least one of an exception and an interrupt.

7. The processor of claim 6 further comprising logic circuitry to re-invoke said accelerator from a point of said freeze.

8. The processor of claim 6 further comprising logic circuitry to invoke an exception handler without waking said thread.

9. The processor of claim 1 wherein a change to any copy of the context made by any of said multiple micro-threads is hidden from an invoking application of said thread.

10. The processor of claim 1 wherein a change to one copy of the context does not change the other copies of the context.

11. The processor of claim 1, wherein the multiple micro-threads are not dependent on each other.

12. A method comprising:
executing a thread on a core of a processor;
invoking, by the thread, an accelerator of the processor, wherein the invocation includes a group of instruction pointers each having a different starting address for a respective micro-thread of multiple micro-threads;
providing, to the accelerator, the group of instruction pointers and a copy of a context of the thread for each of the multiple micro-threads upon the invocation of the accelerator;
and
executing in parallel the multiple micro-threads on the accelerator of the processor using the copies of the context, wherein the thread and the multiple micro-threads are of a same instruction set architecture (ISA).

13. The method of claim 12 further comprising invoking said accelerator with a set of registers identified by an Application Binary Interface (ABI) that specifies semantics of a call made by one routine to another routine.

14. The method of claim 12 wherein said copy of the context for each of the multiple micro-threads is saved to register space of an instruction execution pipeline of said core that executes said thread.

15. The method of claim 12 further comprising switching said thread's context out of a register space of an instruction execution pipeline of said core so that said thread's context is not consuming said register space while said multiple micro-threads are executing.

16. The method of claim 12 further comprising determining a start sequence of said multiple micro-threads from a hint provided through said thread's invocation of said accelerator.

17. The method of claim 12 further comprising said accelerator freezing and saving state information of said multiple micro-threads during operation of said accelerator responsive to at least one of an exception and an interrupt.

18. The method of claim 17 further comprising re-invoking said accelerator from a point of said freeze.

19. The method of claim 12, wherein the multiple micro-threads are not dependent on each other.

20. A non-transitory machine readable storage medium containing program code that when processed by a processor of a computing system causes a method to be performed, the method comprising:
    executing a thread on a core of a processor;
    invoking, by the thread, an accelerator of the processor, wherein the invocation includes a group of instruction pointers each having a different starting address for a respective micro-thread of multiple micro-threads;
    providing, to the accelerator, the group of instruction pointers and a copy of a context of the thread for each of the multiple micro-threads upon the invocation of the accelerator; and
    executing in parallel the multiple micro-threads on the accelerator of the processor using the copies of the context, wherein the thread and the multiple micro-threads are of a same instruction set architecture (ISA).

21. The non-transitory machine readable storage medium of claim 20 wherein said method further comprises invoking said accelerator with a set of registers identified by an Application Binary Interface (ABI) that specifies semantics of a call made by one routine to another routine.

22. The non-transitory machine readable storage medium of claim 20 wherein said method further comprises switching said thread's context out of a register space of an instruction execution pipeline of said core so that said thread's context is not consuming said register space while said multiple micro-threads are executing.

23. The non-transitory machine readable storage medium of claim 20 wherein said method further comprises providing a start sequence of said multiple micro-threads through said thread's invocation of said accelerator.

24. The non-transitory machine readable storage medium of claim 20 wherein said method further comprises freezing and saving state information of said multiple micro-threads during operation of said accelerator responsive to at least one of an exception and an interrupt.

25. The non-transitory machine readable storage medium of claim 20, wherein the multiple micro-threads are not dependent on each other.

* * * * *